United States Patent

Bobeck et al.

[15] 3,665,427

[45] May 23, 1972

[54] MAGNETIC DEVICES UTILIZING GARNET COMPOSITIONS

[72] Inventors: Andrew Henry Bobeck, Chatham; Richard Curry Sherwood, New Providence; Le Grand Gerard Van Uitert, Morris Township, Morris County, all of N.J.

[73] Assignee: Bell Telephone Laboratories, Incorporated, Murray Hill, N.J.

[22] Filed: Apr. 20, 1970

[21] Appl. No.: 30,060

[52] U.S. Cl. ...........340/174 TF, 340/174 MC, 340/174 NA, 252/62.57

[51] Int. Cl. ...........G11b 5/00

[58] Field of Search............340/174 TF, 174 MC; 252/62.57

[56] References Cited

UNITED STATES PATENTS

| | | | |
|---|---|---|---|
| 3,129,412 | 4/1964 | Lovell | 340/174 |
| 3,366,936 | 1/1968 | Snyder | 340/174 |
| 3,444,084 | 5/1969 | Geller et al. | 252/62.57 |

OTHER PUBLICATIONS

Dorn et al. " Annalen der Physik" 22(3– 4) p. 205– 208 (1969).

*Primary Examiner*—James E. Poer
*Assistant Examiner*—J. Cooper
*Attorney*—R. J. Guenther and Edwin B. Cave

[57] ABSTRACT

Rare earth iron garnet crystalline materials magnetic with compositions adjusted so as to lower magnetostriction in the <111> directions are advantageously incorporated in devices depending for their operation on "bubble" domains.

10 Claims, 2 Drawing Figures

INVENTORS: A. H. BOBECK
R.C. SHERWOOD
L.G. VAN UITERT
BY George S. Indig
ATTORNEY

MAGNETIC DEVICES UTILIZING GARNET COMPOSITIONS

BACKGROUND OF THE INVENTION

1. Field of the Invention

The invention is concerned with magnetic "bubble" devices. Such devices, which depend for their operation on the nucleation and/or propagation of small enclosed magnetic domains of polarization opposite to that of the immediately surrounding material, may perform a variety of functions including switching, memory logic, etc.

2. Description of the Prior Art

The last 2 years has seen significant interest develop in a class of magnetic devices known generically as "bubble" domain devices. Such devices described, for example, in *IEEE Transactions Mag.* 5 (1969), pp. 544–553 are generally planar in configuration and are constructed of materials which have magnetically easy directions essentially perpendicular to the plane of the structure. Magnetic properties, e.g., magnetization, anisotropy, coercivity, mobility, are such that the device may be maintained magnetically saturated with magnetization in a direction out of the plane and that small localized regions of polarization aligned opposite to the general polarization direction may be supported. Such localized regions, which are generally cylindrical in configuration, represent memory bits. Interest in devices of this nature is, in large part, based on high bit density. Such densities, which are expected to reach $10^5$ bits or more per square inch of wafer, are, in turn, dependent on the ability of the material to support such localized regions of sufficiently small dimension.

In a particular design directed, for example, to a $10^6$ bit memory, bubble domains of the order of one-third mil in diameter are contemplated. A $10^5$ bit memory may be based on stable domains three times greater, and a $10^7$ bit memory requires stable bubble domains three times smaller.

To date, one of the more significant obstacles to commercial realization of such devices has been the material limitation. The first problem has been a practical one, i.e., growth of sufficiently large crystals which are sufficiently defect-free, shown physical and chemical stability, etc. An equally significant problem is more fundamental. Materials of requisite uniaxial anisotropy have generally been lacking in some aspect. For example, reported operating devices have generally been based on rare earth orthoferrites. While it is quite likely that orthoferrite bubble devices will go into commercial use, usual orthoferrite compositions present an obstacle to development of high-bit density design.

In general, orthoferrites are of such magnetic characteristics as to make difficult the support of bubble domains smaller than about 2 mils in diameter. In usual design, this implies a maximum bit density of the order of $10^5$ bits per square inch.

Attempts to reduce stable domain size at usual operating temperatures have posed fresh problems, e.g., operation near the magnetic reorientation temperature reduces bubble size but results in high magnetostriction, thereby complicating both fabrication and operation. Operation near the reorientation temperature also implies a large temperature dependence of bubble size in turn requiring close temperature control of devices utilizing such compositions. Further, despite emphasis of growth techniques for orthoferrites, materials to date have not been of sufficient crystalline perfection to permit expedient commercial fabrication.

A second class of materials that has received some attention for use in bubble devices is the hexagonal ferrite (e.g., the magnetoplumbites). Magnetic characteristics of these materials are such as to permit support of exceedingly small bubble domains. In fact, the problem has been the reverse of that for the orthoferrites and composition modifications have often been in a direction such as to increase rather than decrease bubble size.

At this time, magnetoplumbites are not considered to be very promising bubble materials, largely because of another limitation, i.e., low mobility. This term refers to the speed with which a bubble may be propagated within the material for a given applied field. Since most devices rely on bubble movement for the performance of the various design functions, low mobility is considered a significant hindrance.

Several approaches have been taken to improve mobility in hexagonal ferrites and various of these have met with some degree of success. While it is possible that such materials with appropriate device characteristics will evolve, the quest continues for classes of materials that have no such inherent limitations.

The past decade has seen substantial device interest in a third class of magnetic materials. These materials, first announced in 1956 (see *Compte Rendue*, Vol. 242, p. 382) are insulating ferrimagnets of the garnet structure. The best known composition is yttrium iron garnet, $Y_3Fe_5O_{12}$, sometimes referred to simply as YIG. Compositional variations are many and include complete or partial substitution by various of the 4*f* rare earths for yttrium, partial substitution of aluminum or gallium for iron, and others. Growth habits of these materials are well understood and many techniques exist for producing large crystals of high perfection.

X-ray studies and fundamental structural considerations have always indicated the magnetic garnets to be magnetically isotropic. From this standpoint garnets have not been natural candidates for bubble devices which require uniaxial magnetic anisotropy. However, virtually from their inception, workers concerned with the garnets have observed regions of magnetic anisotropy. In general, little attention has been paid to such anisotropy and literature references to this phenomenon generally invoke a bulk strain mechanism. On some occasions, the anisotropy has been attributed to surface strain due, for example, to grinding and/or polishing.

Frustrations growing out of the inadequacies of the orthoferrites and hexagonal ferrites have prompted study of the magnetic garnets for use in magnetic devices. To produce the uniaxial magnetic anisotropy needed the garnet samples chosen for these studies have been deliberately strained. While many of the magnetic properties look promising the very dependence on strain is attended by difficulties both in processing and in operation. Operation in strained materials is often limited by a nonuniformity in the induced anisotropy, by a high coercivity, and also by variation of such properties with time.

SUMMARY OF THE INVENTION

In accordance with the invention, it has been determined that reduction of strain sensitivity in garnet compositions, in particular by reduction of magnetostriction by use of mixed ions in particular sites, results in materials having properties which are preferred for incorporation in "bubble" domain devices. In a generic sense, the reduction in magnetostriction is accomplished primarily in the <111> axes. In a preferred embodiment, magnetostriction is also reduced in the <100> 22 axes.

Since reduction in magnetostriction, particularly in the easy direction, diminishes the effect of strain in selection of one such axis as the easy direction of magnetization and since materials of this invention do, indeed, evidence the magnetic anisotropy essential to bubble device use, this work has already prompted renewed study of the mechanistic explanation for garnet anisotropy. In a special case of the preferred class, magnetostriction in both the <111>s and <100>s approaches zero so that bulk strain is not considered to play a role in inducing magnetic anisotropy in a <111> direction.

It is characteristic of materials of this invention not only that they show a magnetic anisotropy of a nature previously attributed to a strain mechanism, but also that the anisotropy is characteristically uniform across large areas of crystalline bodies. Of course, the realization that such anisotropy may be retained in materials of lowered magnetostrictriction has the added advantage of overcoming fabrication problems normally associated with magnetostriction effects. It is observed, for example, that crystal polishing can be carried out using a procedure known to introduce surface strain in the usual highly magnetostrictive garnets. Materials of this invention may be bonded to substrates or may be deposited as by sputtering, vapor deposition, etc. while minimizing or even eliminating the increased coercivity induced in magnetostrictive bubble materials by strain.

Lowered magnetostriction, in accordance with the invention, is accomplished by use of mixtures of ions having opposite signs of magnetostrictive coefficients. In the generic class, the coefficients of concern are primarily or solely those in the <111> directions. In the preferred class, cation mixtures are so chosen as to have opposite sign in the <100> directions as well. The invention is considered to lie, not only in the selection of such cation combinations, but also in the realization that reduced magnetostriction materials retain magnetic anisotropy and, in fact, oftentimes show preferred characteristics for use in bubble devices. The claims are accordingly directed to devices utilizing such materials.

DETAILED DESCRIPTION

1. The FIGS.

Figure 1:
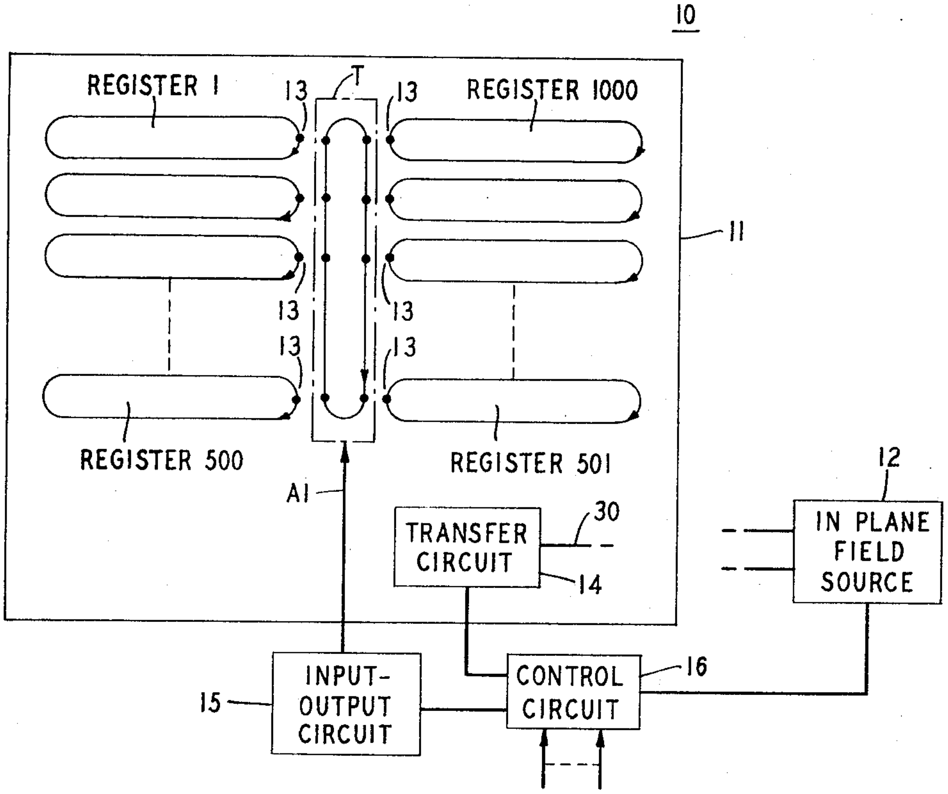
FIGS. 1 and 2 are a schematic representation and plan view, respectively, of a magnetic device utilizing a composition in accordance with the invention.
Figure 2:
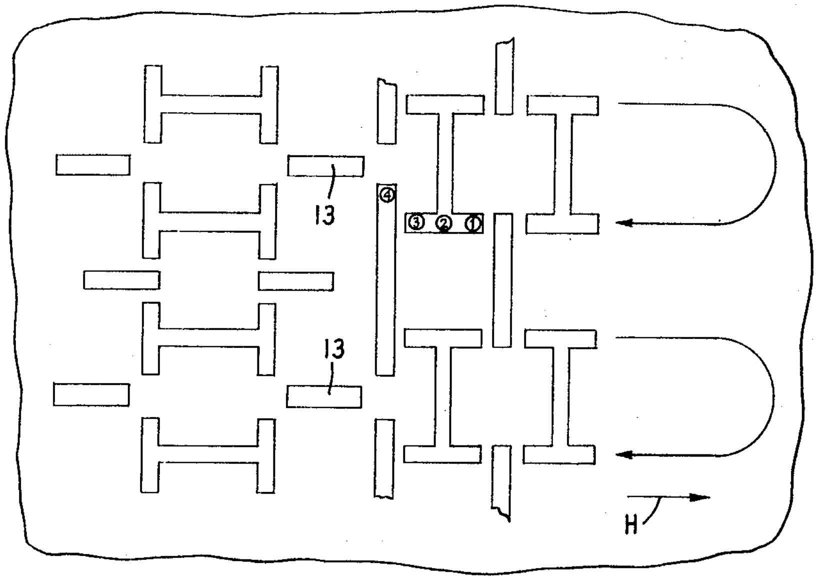

The device of FIGS. 1 and 2 is illustrative of the class of "-bubble" devices described in I.E.E.E. *Transactions on Magnetics*, Vol MAG-5 No. 3 Sept. 1969, pp. 544–553 in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains, in accordance with this invention, is dictated by patterns of magnetically soft overlay material in response to reorienting in-plane fields. For purposes of description, the overlays are bar and T-shaped segments, and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization, in accordance with this invention. Implementation is described further on.

The figure shows a number of horizontal closed loops separated into right and left banks by a vertical closed loop as viewed. It is helpful to visualize information, i.e., domain patterns, circulating clockwise in each loop as an in-plane field rotates clockwise. This operation is consistent with that disclosed in the U.S. Pat. No. 3,534,347 and is explained in more detail hereinafter.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out appropriate vacancies are available in the horizontal channels at positions 13 of FIG. 1 to accept information.

For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3 and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above-mentioned reference publication. Instead, the consecutive positions from the right, as viewed in FIG. 1, for a domain adjacent the vertical channel preparatory to a transfer operation are described. A domain in position 4 of FIG. 2 is ready to begin its transfer cycle.

2. Compositional Considerations

It has been stated that the invention relies, in large part, on the realization that requisite uniaxial anisotropy is retained in garnets so designed as to reduce magnetostriction generically in the <111> directions and, for a preferred class, also in the <100> directions. For the optimum case, it is desired to reduce magnetostriction to a value equal to or very close to zero. This, however, calls for a balancing precision which is not always practically attainable. Since some advantage accrues for any reduction in magnetostriction in the <111> direction and since advantages in operation and in ease of fabrication become measurable with reductions in magnetostriction as small as about 10 percent, the invention may be broadly stated as requiring admixture of cations which result in this degree of reduction in <111> magnetostriction.

The lowest <111> magnetostriction reported for a simple single dodecahedral cation composition ($Eu_3Fe_5O_{12}$) is $1.8 \times 10^{-6}$ centimeters per centimeter of length. From one standpoint, a preferred class in accordance with the invention results in a <111> magnetostriction no greater than $1.6 \times 10^{-6}$. This maximum value of <111> magnetostriction is considered to define a limited inventive embodiment which discounts the fact that other considerations sometimes dictate other dodecahedral cations. A more preferred embodiment from this standpoint requires the <111> magnetostriction to be at a value no greater than $1 \times 10^{-6}$, while a still more preferred embodiment requires a <111> magnetostriction of a maximum value of $0.5 \times 10^{-6}$.

The <111> magnetostriction, since it includes the easy direction of magnetization, is most significant from the inventive standpoint. Reduction of <100> magnetostriction, however, results in further advantage. In fact, minimization of magnetostriction on this axis as well avoids all strain effects relevant to bubble device operation to the extent that these two values of magnetostriction are completely balanced. While simple garnet compositions are available in which magnetostriction is already essentially zero in the <100> direction, modification to reduce the <111> magnetostriction invariably results in compositions having a finite magnetostriction in the <100> direction. In a preferred embodiment of the invention, compositions are further modified so as to minimize the latter value also.

Fortunately, a considerably amount of fundamental work has been directed to the sign and magnitude of the magnetostriction resulting by use of many ions in the garnet system. The following table is a computation of data presented in Vol. 22, *Journal of the Physical Society of Japan*, p. 1,201 (1967). This table presents the magnetostrictive values in dimensionless units representing centimeters change per centimeter of lèngth for $R_3Fe_5O_{12}$ garnet compositions.

TABLE I

| R-ion | λ<111 > | λ<100 > |
|---|---|---|
| Sm | $-8.5\times10^{-6}$ | $+21\times10^{-6}$ |
| Eu | $+1.8\times10^{-6}$ | $+21\times10^{-6}$ |
| Gd | $-3.1\times10^{-6}$ | zero |
| Tb | $+12.0\times10^{-6}$ | $-3.3\times10^{-6}$ |
| Dy | $-5.9\times10^{-6}$ | $-12.5\times10^{-6}$ |
| Ho | $-4.0\times10^{-6}$ | $-3.4\times10^{-6}$ |
| Er | $-4.9\times10^{-6}$ | $+2.0\times10^{-6}$ |
| Tm | $-5.2\times10^{-6}$ | $+1.4\times10^{-6}$ |
| Yb | $-4.5\times10^{-6}$ | $+1.4\times10^{-6}$ |
| Lu | $-2.4\times10^{-6}$ | $-1.4\times10^{-6}$ |
| Y | $-2.4\times10^{-6}$ | $-1.4\times10^{-6}$ |

In Table I the designation, R-ion, refers to the cation occupying the dodecahedral garnet site and columns 2 and 3 set forth the magnetostrictive values for the resulting garnets in the <111> and <100> directions respectively. Reduction of magnetostriction is accomplished by use of a combination of cations having opposite sign. The resulting value is approximately linearly related so that a substantially perfect balance of <111> magnetostriction results upon use of gadolinium and europium in the ratio of 1.8 to 3.1 (the inverse ratio of the magnitudes of the magnetostrictions). Similar adjustment, utilizing the information in Table I, may be made to lessen magnetostriction in the <100> directions, and a simple algebraic approach may be utilized to lower both magnetostrictive values simultaneously.

The following table is illustrative of R-ion combinations calculated to produce minimal values of magnetostriction in both relevant directions.

TABLE II

| Atoms Per Formula Unit of Rare Earth Iron Garnet | | | |
|---|---|---|---|
| Lu (or Y) | Eu | Gd | Tb |
| — | 0.09 | 2.325 | 0.585 |
| 1.34 | 0.16 | 1.00 | 0.50 |
| 1.85 | 0.18 | 0.50 | 0.47 |

Table III includes five compositions together with measured magnetostrictive values in both directions. The garnets of Table III were grown from a flux and the compositions listed were those present in the flux rather than the grown crystals. It is known that there is some deviation between the flux composition and crystal composition. Nevertheless, the two are sufficiently close that the materials of Table III are properly considered exemplary of the inventive teaching. In each instance, magnetostriction was reduced more than 10 percent by inclusion of at least one additional ion having a magnetostrictive sign opposite to that of another ion occupying the concerned site.

TABLE III

| Composition | λ<100> | λ<111 > |
|---|---|---|
| $Er_2TbAlFe_4O_{12}$ | $-0.6\times10^{-6}$ | $-0.67\times10^{-6}$ |
| $Er_2TbA1_{1\ 1}Fe_{3\ 9}O_{12}$ | $-0.4\times10^{-6}$ | $-0.67\times10^{-6}$ |
| $Gd_{2\ 34}Tb_{\ 66}Fe_5O_{12}$ | — | $-0.43\times10^{-6}$ |
| $Gd_{2\ 33}Tb_{\ 58}Eu_{\ 09}Fe_5O_{12}$ | $-0.5\times10^{-6}$ | $+0.10\times10^{-6}$ |
| $Gd_{2\ 25}Tb_{0\ 6}Eu_{\ 15}Fe_5O_{12}$ | $+0.3\times10^{-6}$ | $-0.5\times10^{-6}$ |

The R-ions, Eu, Gd and Tb, form an advantageous grouping in that they have about the same distribution coefficients in a growing crystal so that they can be combined to minimize magnetostriction (in both directions) without marked effect on homogeneity.

The tabular information is not exclusive and other substitutions may be utilized to reduce magnetostriction. For example, substitution of $Mn^{3+}$, $Co^{3+}$ and $Co^{2+}$ in either or both of the tetrahedral and octahedral sites may be useful. As among these, the magnetostriction <111> sign associated with $Mn^{3+}$ is known to be positive, *Journal of Applied Physics*, 38, pp. 1,226–1,227 (1967).

Thus far, the description has been in terms of the inventive concept. While compositions designed with the sole view of reducing magnetostriction are usefully incorporated in bubble devices, further compositional modifications may be introduced by consideration of other material characteristics.

For example, the magnetic moment of the material enters into stable bubble size in accordance with the equation:

$$B \sim E^{1/2}K_u^{1/2}M_s^{-2}$$

in which

*B* is the bubble diameter, $E$ is the magnetic exchange energy $K_u$ is the uniaxial magnetocrystalline anisotropy, and $M_s$ is the moment, all in compatible units. Such considerations give rise to an optimum range, for example, of magnetic moment. For many purposes, the range of suitable moment values is from 30 to 500 gauss. Since, many compositions adjusted to reduce magnetostriction may have moments lying outside this or some other suitable range, it may be desirable also to modify the composition so as to adjust the magnetization while at the same time maintaining a lowered value of magnetostriction. For many compositions, this takes the form of reducing the magnetic moment by substitution of nonmagnetic ions in the prevailing tetrahedral ion sites. Representative substitutions include gallium, aluminum, silicon and germanium (generally ions with radii equal to or smaller than that of trivalent gallium (0.62 A) preferentially enter tetrahedral sites).

Still with a view to tailoring magnetization, substitutions in the dodecahedral site may also be made. It is well known, for example, that gadolinium inclusion may result in a reduction of magnetic moment at room temperature.

Further detailed discussion of this consideration is considered inappropriate to this disclosure. Reference may be made to *Handbook of Microwave Ferrite Materials*, edited by Wilhelm H. Von Aulock, Academic Press, New York, (1965) for such fundamental considerations.

Another parameter of significance in bubble device design is defined as bubble mobility. It is unfortunate that, while the propagation rate of magnetic domains through simple compositions such as yttrium or gadolinium iron garnets are sufficiently high for most design uses, modification, in accordance with the invention, often results in a decrease in such mobility. While device designs exist for which such lowered mobility is adequate, it is often desirable to further modify the material so as to minimize this disadvantageous effect.

It has been observed that mobility lowering is brought about by use of substitutions by cations having an orbital angular momentum. Every modification, in accordance with the invention, in accordance with the tabular information includes one such ion. Fortunately, this decrease in mobility may be diminished by further substitutions, including substitutions by ions having orbital angular momentum, which introduces disorder into the crystal field environment. One approach, referring again to Table I, is to use three or more ions, still balanced approximately algebraically, so as to result in a magnetostriction compensation, again primarily in the <111> directions. Other approaches may be taken, and it has been observed that any modification resulting in a further variation in the ions occupying any given site results in an increase in bubble mobility for compositions containing an ion having an orbital angular momentum.

Another consideration sometimes of concern in device design is temperature stability. Copending application Ser. No. 30,071 filed Apr. 20, 1971 is primarily concerned with compositionals whose moments have minimal temperature dependence consistent with certain other suitable device characteristics. Such compositions generally utilize at least one R-ion selected from the group Gd, Tb, Dy, Ho, Eu, Er and Tm with at least one tetrahedral site substitution to lower moment. Examples of a second class are Ga, A1, Si, Ge and V. All other considerations notwithstanding, compositions, in accordance with the invention, have such ion combinations in one or more sites as to result in magnetostrictive values no higher than the maximum set forth above.

3. Growth

The inventive concept is substantially independent of the growth procedure save that growth at temperature below ~ 1,200° C. is essential to insure ordering conducive to a magnetically uniaxial alignment. (This does not preclude nucleation at higher temperature in a dropping temperature technique since the lower temperature material is matched.) Appropriate crystalline materials may be grown from the flux either spontaneously or on a seed, (see for example *Journal of Physics*, Chem Solids Suppl. Crystal Growth, edited by H. S. Peiser (1967) pp. 441–444 and *Journal of Applied Physics*, Suppl. 33, p. 1,362 (1962).), hydrothermally (see *Journal of American Ceramics Society*, 45, 51 (1962) by deposition as from the vapor by evaporation, sputtering, tthermal decomposition, or zone gradient transfer, (see for example *Journal of Applied Physics*, 39, p. 4,700 (1968), *Applied Physics Letters* 10, pp. 190–194 (1967) Crystal Growth, editors F. C. Frank, J. B. Mullin and H. S. Peiser, 443 ( 1969).

What is claimed is:

1. Memory device comprising a body of material capable of evidencing uniaxial magnetic anisotropy capable of supporting local enclosed regions of magnetic polarization opposite to that of surrounding material and provided with means for positioning such oppositely polarized local enclosed regions thereby resulting in single wall domains evidencing a magnetic polarization opposite to that of adjoining portions of the surrounding material and second means for propagating said domains through at least a part of the said body in which said material is ferrimagnetic, characterized in that said material is of the garnet structure, in that the said material is a rare earth iron garnet in which the dodecahedral sites are occupied by ions including at least two ions of different sign selected from the group consisting of Sm(−), Eu(+), Gd(−), Tb(+), Dy(+), Ho(−), Er(−), Tm(−), Yb(−), Lu(−), and Y(−) in which notations the parenthetical signs are the magnetostriction signs of the preceding ions in the <111> directions and in that the magnetostriction of said material in the <111> direction is of a magnitude at least 10 percent below that of the garnet material containing only one such ion.

2. Device of claim 1 in which the <111> magnetostriction of said material is of a maximum value of approximately $1.6 \times 10^{-6}$ cm. change per cm. of length.

3. Device of claim 2 in which the <111> magnetostriction of said material is of a maximum value of approximately $1 \times 10^{-6}$ cm. change per cm. of length.

4. Device of claim 2 in which the <111> magnetostriction of said material is of a maximum value of approximately $0.5 \times 10^{-6}$ cm. change per cm. of length.

5. Device of claim 1 in which the magnetostriction values of said material approximately equal to zero in both the <111> and <100> directions.

6. Device of claim 1 in which the tetrahedral sites in said material are occupied by at least one ion of atoms selected from the group consisting of gallium, aluminum, silicon, germanium and vanadium in such amounts so as to result in a magnetic moment value within the range of from about 30 to about 500 gauss at room temperature.

7. Device of claim 6 in which the said moment is within the range of from about 70 to 300 gauss at room temperature.

8. Device of claim 1 in which one of the said ions is $Tb^{3+}$.

9. Device of claim 8 in which one of the said ions is $Gd^{3+}$.

10. Device of claim 1 in which one of the said ions is $Eu^{3+}$.

* * * * *

UNITED STATES PATENT OFFICE
CERTIFICATE OF CORRECTION

Patent No. 3,665,427 Dated May 23, 1972

Inventor(s) A.H.Bobeck, R.C.Sherwood, L.G.Van Uitert

It is certified that error appears in the above-identified patent and that said Letters Patent are hereby corrected as shown below:

Abstract, line 1, after "garnet" insert --magnetic--,
after "materials" delete "magnetic".

Col. 6, line 48, change "$Er_2TbAl_{1\ 1}Fe_{3\ 9}O_{12}$" to --$Er_2TbAl_{1.1}Fe_{3.9}O_{12}$--;

line 49, change "$Gd_{2\ 34}Tb_{\ 66}Fe_5O_{12}$" to --$Gd_{2.34}Tb_{.66}Fe_5O_{12}$--;

line 50, change "$Gd_{2\ 33}Tb_{\ 58}Eu_{\ 09}Fe_5O_{12}$" to --$Gd_{2.33}Tb_{.58}Eu_{.09}Fe_5O_{12}$--.

Col. 7, line 55, change "April 20, 1971" to --April 20, 1970--;

Col. 8, line 15, change "tthermal" to --thermal--;

line 34, change "Dy(+)" to --Dy(-)--.

Signed and sealed this 27th day of February 1973.

(SEAL)
Attest:

EDWARD M.FLETCHER,JR. — Attesting Officer

ROBERT GOTTSCHALK — Commissioner of Patents

ORM PO-1050 (10-69)

USCOMM-DC 60376-P69
☆ U.S. GOVERNMENT PRINTING OFFICE 1969 O—366-334

UNITED STATES PATENT OFFICE
CERTIFICATE OF CORRECTION

Patent No. 3,665,427 Dated May 23, 1972

Inventor(s) Andrew Henry Bobeck et al.

It is certified that error appears in the above-identified patent and that said Letters Patent are hereby corrected as shown below:

Column 2, line 74, after "lowered" delete "magnetostrictriction" and insert -- magnetostriction --.

Signed and sealed this 17th day of April 1973.

(SEAL)
Attest:

EDWARD M.FLETCHER,JR.
Attesting OFficer

ROBERT GOTTSCHALK
Commissioner of Patents